Dec. 13, 1949                A. WETZEL                    2,491,346
                    FIXTURE FOR GRINDING TWIST DRILL TIPS
Filed June 4, 1947                                  4 Sheets-Sheet 1

INVENTOR
Albert Wetzel

Barnes, Kisselle, Laughlin & Raisch
BY                              ATTORNEYS

Dec. 13, 1949   A. WETZEL   2,491,346
FIXTURE FOR GRINDING TWIST DRILL TIPS
Filed June 4, 1947   4 Sheets-Sheet 2

INVENTOR
Albert Wetzel

Barnes, Kisselle, Laughlin & Raisch
BY
ATTORNEYS

Dec. 13, 1949          A. WETZEL          2,491,346
FIXTURE FOR GRINDING TWIST DRILL TIPS
Filed June 4, 1947          4 Sheets-Sheet 3
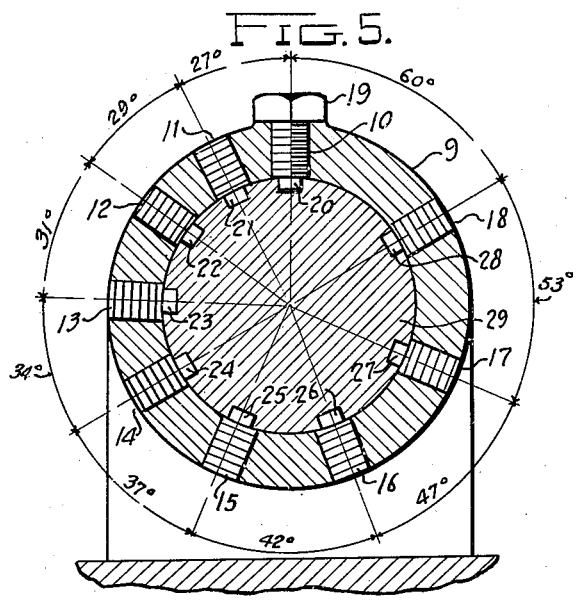
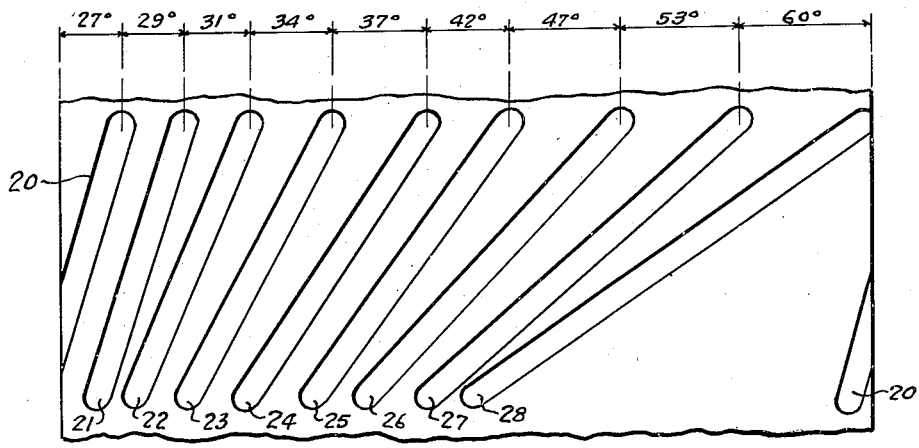
INVENTOR
Albert Wetzel
BY          ATTORNEYS Dec. 13, 1949     A. WETZEL     2,491,346
FIXTURE FOR GRINDING TWIST DRILL TIPS Filed June 4, 1947     4 Sheets-Sheet 4

INVENTOR
Albert Wetzel

Barnes, Kisselle, Laughlin & Raisch
BY     ATTORNEYS

Patented Dec. 13, 1949

2,491,346

UNITED STATES PATENT OFFICE 2,491,346

FIXTURE FOR GRINDING TWIST DRILL TIPS

Albert Wetzel, Detroit, Mich., assignor to Carboloy Company, Inc., a corporation of New York Application June 4, 1947, Serial No. 752,547

9 Claims. (Cl. 51—95)

This invention relates to a fixture for grinding twist drill tips and in particular to a fixture for grinding a cemented tungsten carbide twist drill tip or ingot to produce on each side of the drill tip a flat surface coupled with a rounded contour which is a portion of a helical flute.

It is old and well known to fabricate a twist drill by brazing a sintered tungsten carbide tip into a slot in the end of a steel drill body and subsequently grinding the cemented carbide tip to the desired contour which is usually a spiral flute corresponding to the spiral flute in the steel drill body. This method of grinding the cemented carbide tip after it has been brazed to the steel drill body has been satisfactory for small sized drills, say, for example, of less than one-quarter inch in diameter, but expensive. In the larger size drills it has been common to grind the contour on the cemented carbide tip in a pre-sintered state by hand grinding. Hand grinding has not been desirable for many reasons such as inaccuracy and lack of uniformity of the hand ground tip, high production cost, and slowness of production.

It is an object of this invention to produce an apparatus that will efficiently, economically and accurately grind a desired helical groove or contour on a cemented tungsten carbide twist drill tip, preferably in pre-sintered state, to correspond to the helical flute on the steel drill body.

This invention contemplates a fixture for grinding twist drill tips from pre-sintered carbide blanks which has all the advantages of machine production over those of hand production.

In the drawings:

Fig. 5 is a section along the line 5—5 of Fig. 4.

Fig. 6 is a developed view of the cam spirals in my fixture.

Figure 1:
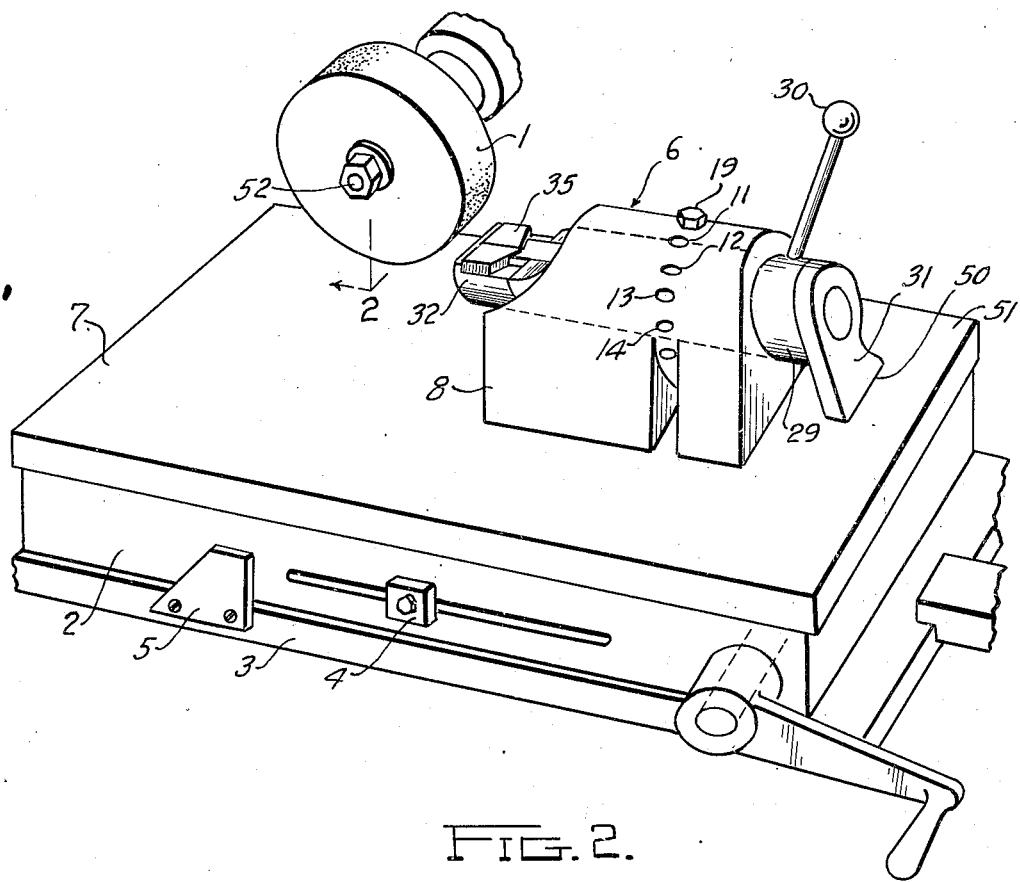
Fig. 1 is a perspective view showing my fixture for grinding cemented tungsten carbide twist drill tips.

My grinding fixture is adapted for use with any conventional grinder. In Fig. 1 I have illustrated a grinder having a rotary grinding wheel 1, a table 2 which has a forward and return traverse. The frame of the grinder is designated 3. Reciprocating table 2 is provided with an adjustable stop 4 which co-acts with fixed stop 5 on frame 3 to limit or stop table 2 at the end of its forward stroke preparatory to reversing of the conventional traversing mechanism for returning the reciprocating table 2 to its starting position.

My fixture is generally designated 6 and can be mounted upon table 2 in any conventional manner. As shown, table 2 is provided with a magnetic chuck 7 for holding my fixture 6 upon table 2.

My fixture comprises a body 8 which is held magnetically upon chuck 7 so that body 8 cannot move relative to chuck 7. Body 8 is provided with a hollow cylindrical portion 9 the circumference of which is provided with a plurality of drilled and tapped holes 10, 11, 12, 13, 14, 15, 16, 17 and 18 spaced circumferentially about cylinder 9 as indicated in Fig. 5. These holes are arranged to receive a threaded key 19, the inner end of which is arranged to have a nice sliding fit in any one of helical grooves 20, 21, 22, 23, 24, 25, 26, 27, 28 formed in the outer surface of cylinder 29 which has a nice sliding and rotatable fit within hollow cylinder 9. Cylinder 29 is provided with a handle 30 and a stop 31 is affixed to the rear end of the cylinder. The forward end of cylinder 29 has attached thereto a semi-cylindrical work holder 32 by means of screws 33, Fig. 4. The upper face 34 of the work holder is a plane surface and receives the tip blank 35 which is to be ground. The forward end of holder 32 is provided with a shoulder 36 against which the straight end 37 of the blank abuts. The forward end of cylinder 29 is reduced as at 41 to substantially semicylindrical shape. A work clamp 38 having a V groove 39 is slidably mounted in groove 40 in the upper face of the forward portion 41 of cylinder 29. Clamp 38 is provided with two counterbores 42 which slidably receive guide pins 43 and thereby retain clamp 38 in operative relation with groove 40. The inner ends of pins 43 are fixed in counterbores 44 in cylinder 29. A compression spring 45 yieldably projects the clamp 38 in clamping engagement with tip 35. The V groove 39 in clamp 38 interengages the apex of drill tip 35.

Figure 2:
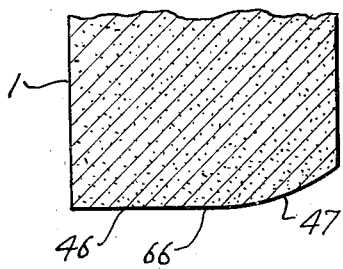
Fig. 2 is a section along the line 2—2 of Fig. 1 illustrating the contour of the grinding wheel.

The contour of wheel 1 is illustrated in Fig. 2.

One half of the circumferential grinding face of wheel 1 is in the form of a true cylinder 46 and the other half is curved or in the form of a segment of a sphere 47. The radius of curve 47 will depend upon the helix angle of the helical groove it is desired to grind in the tip 35. Thus, in section, portion 46 of wheel 1 will make a straight line contact with the tip being ground and portion 47 will make an arcuate contact with the face of the tip being ground.

The tip 35 of cemented tungsten carbide will preferably be ground in its pre-sintered state. The tip will be mounted in holder 32 as above described and handle 30 will be swung to its furthermost position to the right, Fig. 1, so that the lower face 50 of stop 31 rests upon the upper face 51 of magnetic chuck 7. In this position face 34 of holder 32 will be parallel to the axis 52 of grinding wheel 1. Fixture 6 will be mounted upon table 2 so that in its forward and return traverse fixture 6 and, of course, tip 35 will travel in a direction perpendicular to the axis about which wheel 1 rotates and the axial center-line 65 of the tip will be aligned with the junction line 66 of surfaces 46, 47 on wheel 1.

Grooves 20 to 28 are designed for tips of different diameters within the range of the fixture, groove 20 having the largest lead and groove 28 the smallest lead and the leads of grooves 21 to 27 are graduated therebetween. Thus groove 20 will be selected for the tip with the largest diameter within the range of the fixture and groove 28 for the tip having the smallest diameter and grooves 21 to 27 for tips having intermediate diameters. The fixture can be designed to grind tips of any and all practical diameters. The grooves 20 to 28 start on a common circumference of cylinder 29 and terminate on another common circumference of the cylinder, the starting ends of the grooves being spaced circumferentially the number of degrees indicated in Fig. 6. The operator of my fixture will, of course, know the diameter of the tip 35 which is to be ground with a helical flute. Knowing this diameter, the operator will select whichever of grooves 20 to 28 corresponds to this diameter. Assume that one desires to grind a tip having a diameter corresponding to groove 20, then cylinder 29 is positioned within hollow cylinder 9 so that groove 20 aligns with opening 10 and key 19 is screwed into opening 10 so that the inner end of key 19 slidably interengages cam keyway 20. With tip 35 in position, stop 50 against face 51 of chuck 7, and with table 2 at the end of its return stroke, the table is now set in operation on its forward traverse in a conventional manner. As tip 35 passes beneath wheel 1 on the forward traverse, surface 46 of the wheel will grind plane face 55 on blank tip 35 and as soon as tip 35 has completed its forward pass in grinding relation with wheel 1, table 2 will reverse its travel and return to its starting position. Grinding wheel 1, of course rotates continuously irrespective of the movement of table 2.

Figure 3:
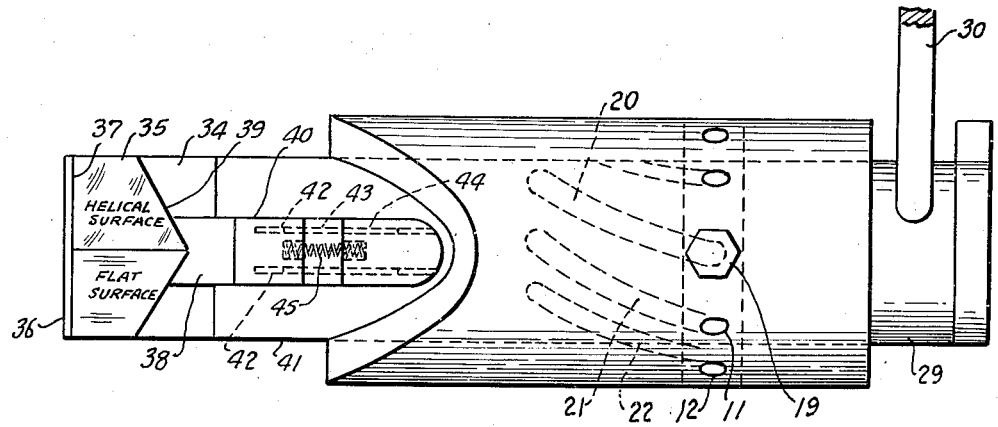
Fig. 3 is a plan view of my fixture with the cemented carbide tip in grinding position.
Figure 4:
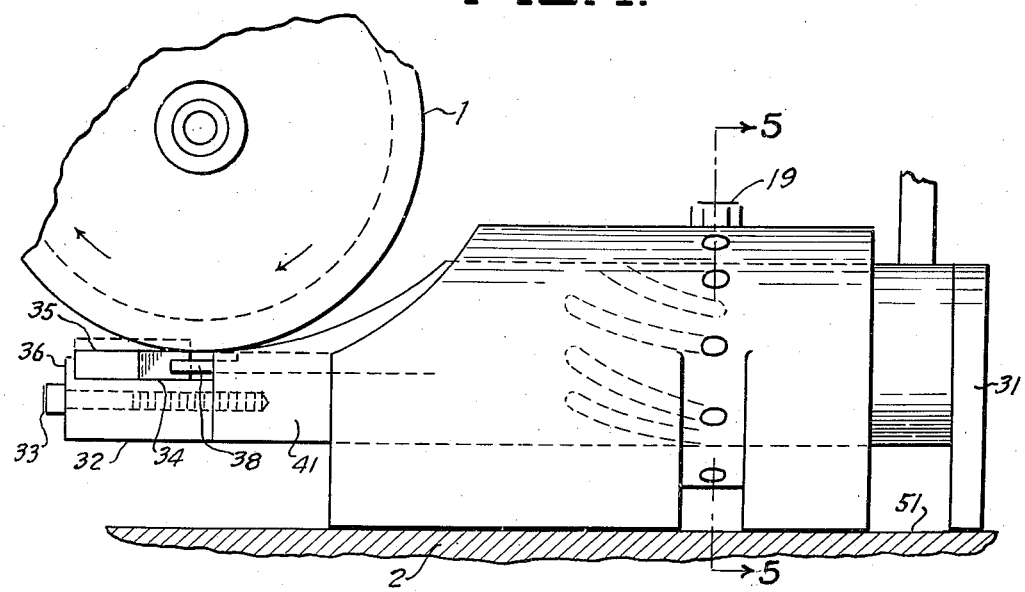
Fig. 4 is a side elevation of the same.
Figure 7:
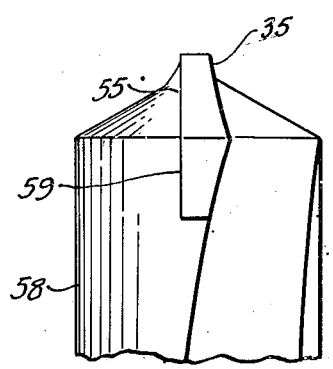
Fig. 7 is a fragmentary elevation of a twist drill showing a portion of the steel drill body and the pre-ground cemented tungsten carbide tip brazed to the drill body.

In practice a large run or number of tips 35 will first have their flat surfaces 55 ground as above described. After the tips have their flat faces 55 ground, as above described, then my fixture 6 can be operated independently of reciprocation of table 2 to grind the helical flutes or surfaces 56 on tip 35. In grinding the helical faces on tip 35, table 2 is maintained stationary and reciprocation of fixture 6 is not necessary. It is merely necessary to reciprocate and simultaneously rotate cylinder 29 by means of handle 30 to accomplish the grinding of spiral faces 56. Fixture 6 will remain in position upon chuck 7, as above described, and table 2 will be moved from the position shown in Fig. 1 to the left so that stop 4 abuts stop 5. This position is shown in Fig. 4. Table 2 will remain in this position as long as the helical flutes are being ground in the tips. As shown in Figs. 1, 3 and 4, stop 31 abuts surface 51 and tool holder 32 is in projected or its leftwardmost position with respect to body 8. Handle 30 will be rotated toward the viewer, Figs. 1 and 4, until key 19 engages the leftward end of spiral groove 20. Thus, key 19 and spiral groove 20 co-act with a screw action to move cylinder 29 and holder 32 toward the right or retracted position. Key 19 will engage the left hand end of groove 20 to arrest the retracting movement of cylinder 29.

Figure 11:
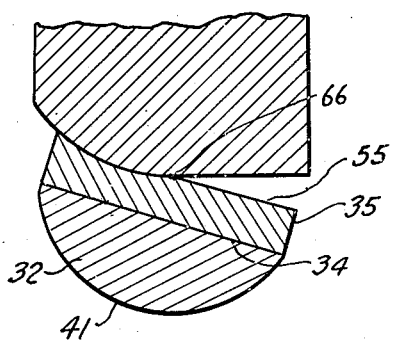
Fig. 11 is a detail showing the grinding of the spiral or helical flute in the surface of the drill tip.

While in fully retracted position a tip 35 which is to be ground is inserted in holder 32. The handle 30 is now swung away from the reader, as viewed in Fig. 1, until stop 31 abuts surface 51, as shown in Figs. 1 and 4. This causes cylinder 29 and work holder 32 to move toward the left with a spiral movement, and at the end of this projecting stroke tip 35 will be in the position shown in Fig. 4. Handle 30 will now be pulled toward the reader, as viewed in Figs. 1 and 4, and the co-action between key 19 and groove 20 will cause cylinder 29 and holder 32 to spiral toward the right and clear of wheel 1. Thus, the rotation of cylinder 29 by handle 30 causes key 19 to co-act with helical groove 20 to effect a simultaneous axial travel of cylinder 29 and holder 32 so that the tip also rotates and moves axially with a spiral movement as it is ground by arcuate surface 47 on wheel 1 (see Fig. 11). Thus, to grind a helical groove in one side of the tip it is merely necessary to insert the tip in holder 32, swing handle 30 away from the reader, as viewed in Fig. 1, until stop 31 abuts surface 50 and then draw handle 30 toward the reader until key 19 abuts the left hand end of groove 20. The tip now will be turned over in the holder and this operation repeated to grind the helical surface in the other side of the tip. Once the fixture is properly positioned on chuck 7 with respect to grinding wheel 1, tips can be ground accurately, easily and at a high rate by the simple manipulation of fixture 6, as above outlined.

Figure 8:
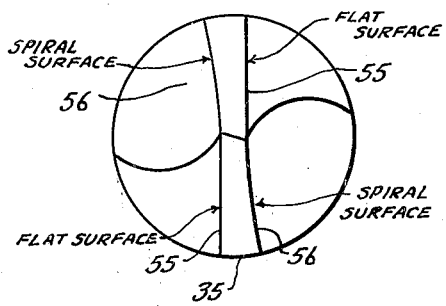
Fig. 8 is an end view of the finished twist drill.
Figure 9:
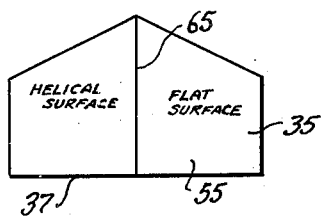
Fig. 9 is a detail of the cemented carbide twist drill tip.
Figure 10:
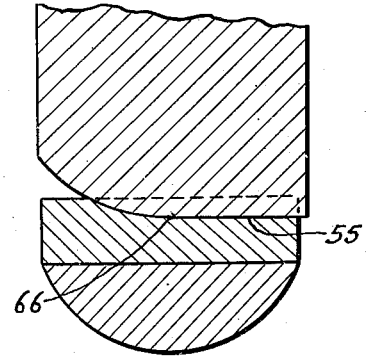
Fig. 10 is a detail showing the grinding of the flat surface on the drill tip.

Referring to Fig. 8, it will be noted that the flat surface on one face of tip 35 is opposite a spiral surface on the opposite face of tip 35 which necessarily results from turning tip 35 over through an arc of 180°.

During the forward traverse of table 2 the lower face 50 of stop 31 must always have a flat engagement with face 51 to insure the grinding of the flat surface 55 upon tip 35 during the forward traverse of the fixture and grinder table 2. Holes 10 to 18 must always be accurately aligned with their corresponding grooves 20 to 28 and with stop 31 so that when stop 31 abuts surface 51 of chuck 7 each of the holes 10 to 18 will be accurately aligned with its respective groove 20 to 28.

Each twist drill tip 35 ground in this manner presents two flat parallel surfaces 55 on opposite sides of the tip that becomes the contact surfaces with the steel drill body 58 upon brazing tip 35 into the slot 59 in the drill body.

It will be seen from the above that my fixture will insure accurate and uniform grinding of cemented carbide twist drill tips at a faster rate and lower cost than conventional methods now in use.

I claim:
1. In combination, a grinding wheel having a grinding surface contour which in cross-section is an arcuate line, a body mounted adjacent said wheel, a work piece support having an axially extending flat surface adapted to support the work piece and journalled in said body for rotary and axial movement to and away from said wheel, means for effecting a helical movement of said work piece support when the latter is turned relative to said body, the said work support being adapted to travel in a path perpendicular to the axis of rotation of said wheel, and stop means in the form of an arm fixed to said work support member, and a stationary abutment against which the arm abuts for arresting helical movement between said work holder and body in one direction only, said stop arm and abutment being correlated with said flat face of the work support whereby when the stop arm is in abutting relation with said stationary abutment the flat work support face will be parallel to the axis of rotation of said grinding wheel whereby when a work piece is mounted in said holder said work piece is caused to traverse the arcuate surface of said grinding wheel with a helical movement and a helical groove is ground upon said work piece.

2. In combination with a grinding wheel having one part of the circumferential grinding face of the wheel in the form of a true cylinder and the other part of the circumferential grinding face having a contour which in cross section is an arcuate line for grinding a helical surface in juxtaposition to a flat surface upon a work piece, a fixture comprising a body member, a work holder member journalled in said body for simultaneous rotary and axial movement therein, a work support surface on said work holder, stop means for holding the work holder stationary relative to said body and for locating said work support surface and flat surface in planes parallel to the axis of the grinding wheel, means supporting said fixture for travel in a path perpendicular to the axis of rotation of said wheel whereby as the work piece traverses the cylindrical face of said grinding wheel a flat surface is ground upon said work piece, and means co-acting between said work holder and body for effecting a helical movement of the work holder member relative to said body member whereby as the work piece traverses the arcuate surface of said grinding wheel a helical surface is ground on the work piece in juxtaposition to said flat surface.

3. In combination with a grinding wheel having one part of the circumferential grinding face of the wheel in the form of a true cylinder and the other part of the circumferential grinding face having a contour which in cross section is an arcuate line for grinding a helical surface in juxtaposition to a flat surface upon a work piece, a fixture comprising a body member, a work holder member journalled in said body for both rotary and axial movement therein, a work support surface on said work holder, stop means for locating said work support surface in a plane parallel to the axis of the grinding wheel, means supporting said fixture for travel in a path perpendicular to the axis of rotation of said wheel while said work support surface is parallel to the axis of the grinding wheel, a helical groove in one of said members and a key mounted on the other of said members adapted to engage said groove for effecting a helical movement of the work holder member relative to said body member whereby as the work piece traverses the arcuate surface of said grinding wheel a helical surface is ground on the work piece in juxtaposition to said flat surface.

4. A fixture adapted for use with a grinding wheel for grinding twist drill tip blanks, said fixture comprising in combination a support having a cylindrical bearing therein, a drill tip blank holder having a cylindrical portion journalled in said cylindrical bearing for rotary and axial movement, said holder having a portion extending without said cylindrical bearing and having an axially extending flat face serving as a seat for the drill tip blank which is to be ground, cooperating means on said holder and support for effecting a helical movement of said work holder with respect to said support when the holder is turned in said support bearing, and means cooperating with said holder for arresting rotation of said holder in one direction and for positioning said flat surface in a plane substantially parallel to the axis of rotation of said grinding wheel whereby turning of said tip holder in the opposite direction causes said flat tip support surface to travel in a helical path.

5. The fixture claimed in claim 4 wherein said blank holder is provided with a shoulder on one side of said flat surface and a retractable clamp on the other side of said flat surface and cooperating with said shoulder to removably clamp a drill tip blank on said flat surface whereby the upper surface of said blank is freely accessible for grinding.

6. A fixture adapted for use with a grinding wheel for grinding twist drill tip blanks, said fixture comprising in combination a support having a cylindrical bearing therein, a drill tip blank holder having a cylindrical portion journalled in said cylindrical bearing for rotary and axial movement, said holder having a portion extending without said cylindrical bearing and having an axially extending flat face serving as a seat for the drill tip blank which is to be ground, said cylindrical holder having a plurality of helical grooves formed in its outer surface, said grooves starting on a common circumference of the cylinder, said grooves having different leads, said cylindrical support having a plurality of holes spaced about a common circumference and corresponding in number with said helical grooves, said holes being spaced circumferentially to correspond with the lead ends of said helical grooves, and a removable key adapted to be passed through any one of said holes and into its corresponding helical groove whereby upon rotation of said tip holder the pin and helical groove cause said tip holder to simultaneously rotate and travel axially in its bearing support, and means cooperating with said tip blank holder in all combinations of said pin and helical grooves for arresting rotation of said blank tip holder in one direction and for positioning said flat surface in a plane substantially parallel to the axis of rotation of said grinding wheel.

7. The combination with the fixture claimed in claim 6 of a grinding wheel having its axis of rotation positioned perpendicular to the longitudinal axis of said tip holder, said wheel having a portion of its circumferential grinding face in radial section in the form of an arc whereby turning of said tip holder causes the tip to traverse the arcuate grinding surface of said grinding wheel and a helical surface is ground in a portion of one face of said tip blank.

8. The combination claimed in claim 7 wherein said grinding wheel has another portion of its circumferential grinding face in the form of a cylinder, and means for moving said fixture in a plane substantially perpendicular to the axis of said grinding wheel while said means holds said blank holder against rotation whereby the other portion of the said face of said blank is ground flat by the cylindrical portion of said wheel.

9. In combination with a rotary grinding wheel having a portion of its circumferential surface in radial section in the form of an arc, a fixture comprising a body member having a cylindrical bearing therein, the axis of which extends substantially perpendicular to the axis of said grinding wheel, a work piece holder member having a cylindrical portion journalled in said cylindrical bearing and a portion extending beyond said bearing and having an axially extending flat surface thereon adapted to receive a flat twist drill tip blank for grinding, said flat surface having a shoulder at one end, a yieldable clamp opposite to, and cooperating with, said shoulder for clamping said blank therebetween and upon said flat surface, stop means for said work holder for locating the tip support surface in a plane parallel to the axis of said grinding wheel, a helical groove in one of said fixture members, and a key mounted in the other of said fixture members adapted to engage said groove for effecting a helical movement of the flat surface whereby as the blank traverses the arcuate surface of said grinding wheel a helical surface is ground on the blank.

ALBERT WETZEL.

REFERENCES CITED

The following references are of record in the file of this patent:

UNITED STATES PATENTS

| Number    | Name      | Date          |
|-----------|-----------|---------------|
| 141,760   | Card      | Aug. 12, 1873 |
| 1,314,514 | Scrivenor | Aug. 26, 1919 |
| 1,402,473 | Bickford  | Jan. 3, 1922  |
| 1,698,807 | Willhauck | Jan. 15, 1929 |
| 2,332,510 | Franzen   | Oct. 26, 1943 |
| 2,362,288 | Melin     | Nov. 7, 1944  |